United States Patent Office 3,139,184
Patented June 30, 1964

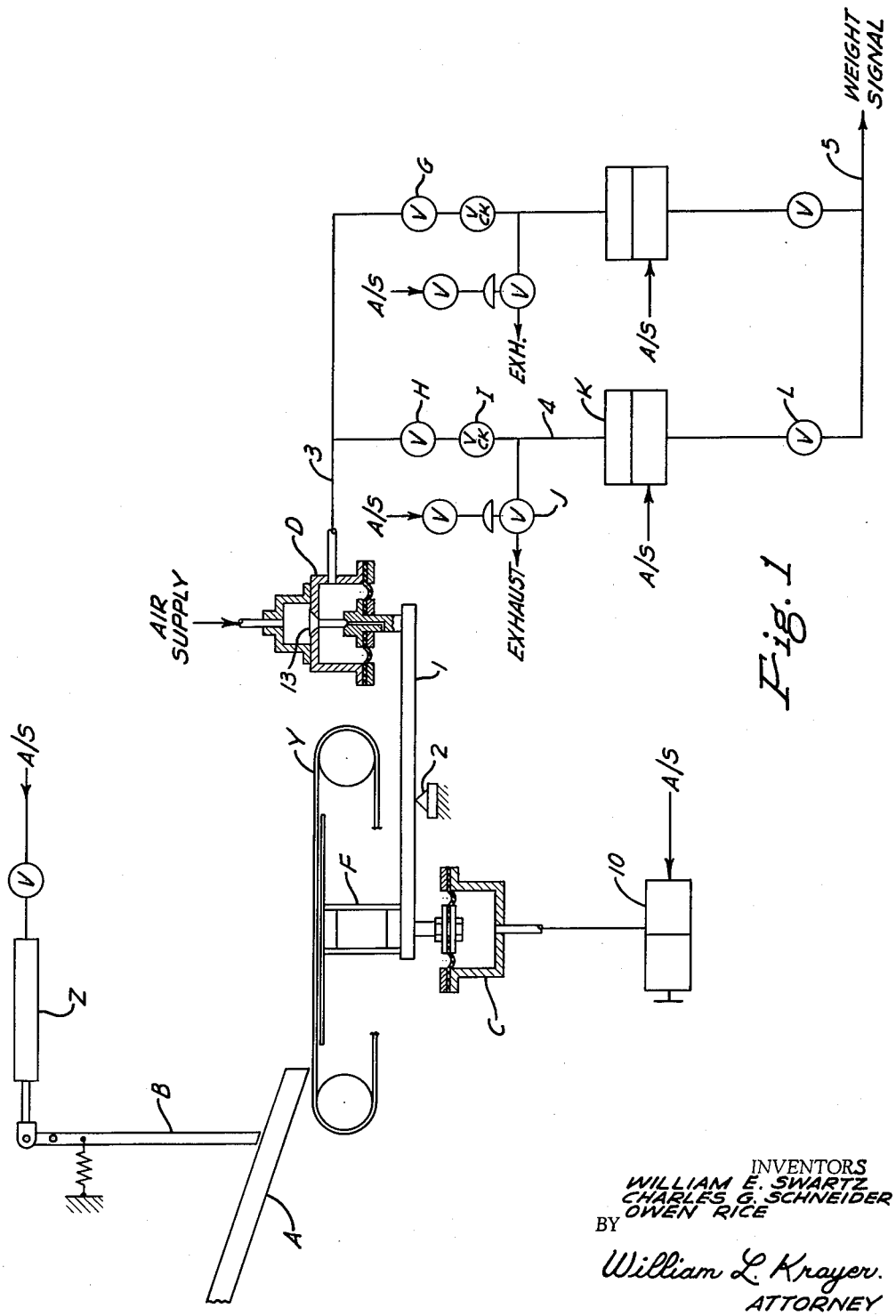

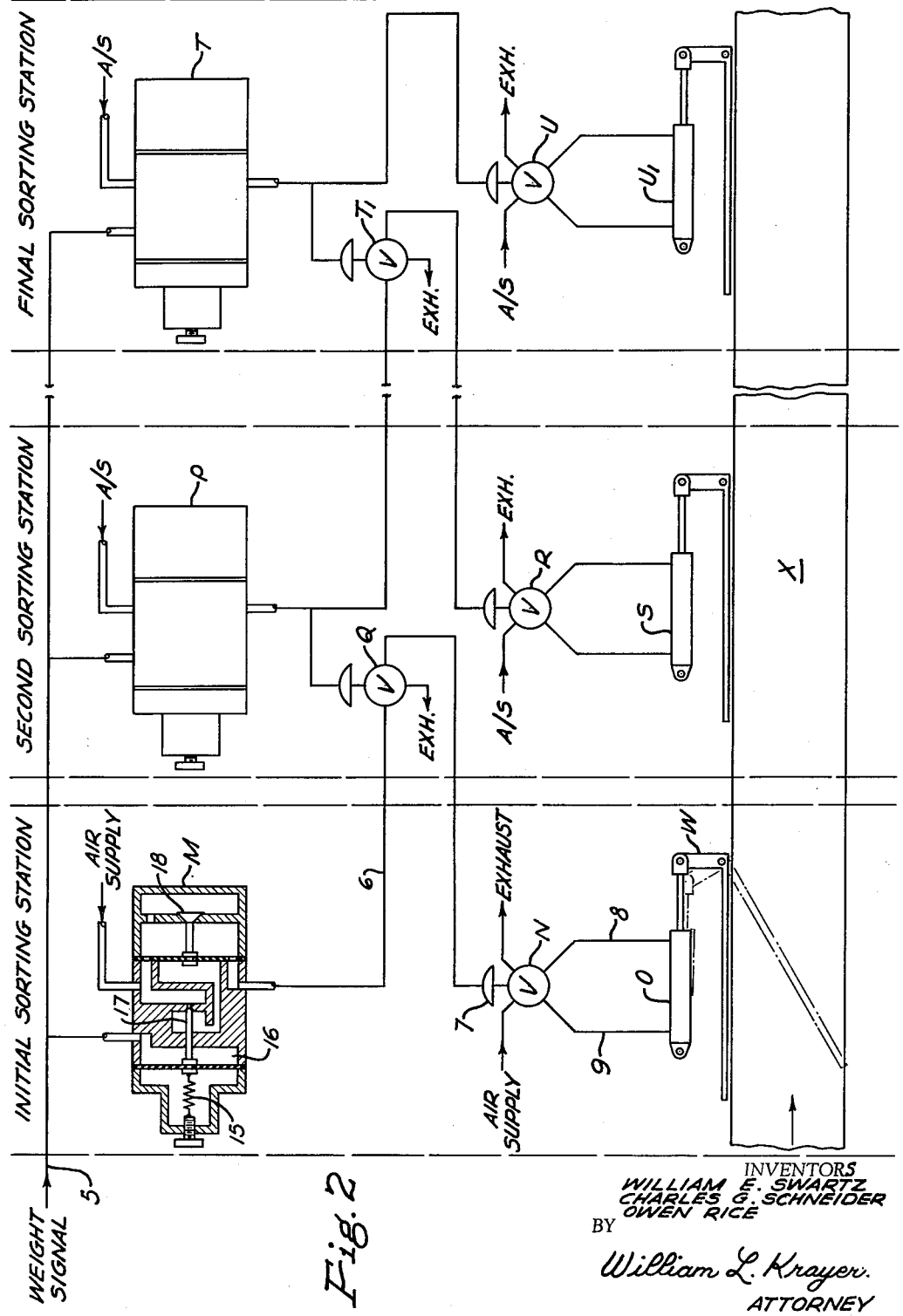

3,139,184
SORTING APPARATUS
Owen Rice, Bridgeville, Charles G. Schneider, Pittsburgh, and William E. Swartz, McKeesport, Pa., assignors to Calgon Corporation, a corporation of Pennsylvania
Filed Jan. 8, 1962, Ser. No. 164,876
2 Claims. (Cl. 209—121)

This invention relates to apparatus for performing process steps on objects in relation to their classification by weight. More particularly, it relates to conveying apparatus for sorting objects by weight.

Heretofore, it has been an expensive and difficult matter to sort objects by weight from a moving conveyor. The trend recently has been toward electronic controls for such apparatus. Electrically controlled conveying and sorting apparatus has, however, proven unreliable for a variety of applications. Particularly in the food handling industry and other industries handling moist, greasy, or otherwise corrosive or electrically conductive materials, electrical apparatus is quite often unsatisfactory.

We have invented an apparatus which is not subject to short circuits from foreign materials. It is far more rugged than other sorting apparatus and, partly because of its unique pneumatic circuitry, is relatively cheap. As will be seen from the drawings, standard pneumatic control components are utilized, thus providing ease of assembly and service. Operation of the apparatus will be partially recited along with an explanation of the drawings.

FIGURES 1 and 2 are a more or less diagrammatic illustration of the presently preferred form of our invention applied to the step of sorting by weight. FIG. 1 shows the weighing and memory sections and FIG. 2 the sorting section.

A general description of the operation of the apparatus as applied to the sorting of hams by weight will be recited first, referring to the components of the apparatus by their reference letters. In FIG. 1, feed section A is a continuous belt which feeds hams, preferably one at a time, by mechanism not shown. Any means for feeding hams to the machine may be used. Device B is a gate which is raised at predetermined intervals through the operation of pneumatic cylinder Z or other suitable device preferably on command of an automatic programmer. Hams are thus fed singly by known means to the weighing section Y of the moving belt. Under the weighing section is a force balance device preferably comprising platform and support F, pneumatic chamber C, and signal generating chamber D, all mounted on a fixed beam 1 and fulcrum 2. A predetermined bias or tare primarily to compensate for the belt and platform is introduced to chamber C by a standard hand sender 10. The weighing station, as will be explained infra, generates a pneumatic pressure signal proportional to the weight of the ham on the belt. This signal is transmitted through conduit 3 to the memory section comprising units G-L and corresponding components shown but not labeled.

The purpose of the memory section is to preserve a weight signal for use in the sorting section while permitting another ham to be weighed on the weighing section. The memory section shown herein is the subject of another patent application, filed concurrently herewith, by Charles G. Schneider and William E. Swartz, S.N. 164,875, entitled "Pneumatic Memory Device," and assigned to the assignee herein, the entire disclosure of which is adopted as a part of this disclosure.

The input to the memory device in line 3 is conducted to normally closed mechanically operated valves G and H. Their operation is preferably controlled by an automatic programmer, which is not shown. Valves G and H should not be opened at the same time. When valve H, for example, is opened by the programmer, the weight signal in line 3 passes through checkvalve I to normally closed dump valve J and booster K. The booster is a dead-end diaphragm-type pneumatic amplifier, preferably of a type such as Governaire Models 2000 and 4500 Volume Booster Relays. Any such dead-end pneumatic relay device will suffice. Checkvalve I traps the weight signal in line 4 between checkvalve I and booster K. Booster K generates an output signal proportional to the trapped weight signal, which output signal is transmitted to normally closed mechanically operated valve L. Valve H may then be closed by the programmer and thereafter valves G and L may be opened, permitting the introduction of a new weight signal to the other section of the memory device and the transmission of the output signal from booster K to the sorting section through conduit 5.

The output of the memory device is conducted through conduit 5 to a series of sorting stations, three of which are shown in FIG. 2. In the meantime, the ham whose weight the signal represents is moved from the weighing station belt to the sorting station. In the preferred embodiment, the weighing section belt is slightly higher than the sorting section belt and contiguous thereto.

The weight signal as modified by booster K is received by pilot-operated toggle relays M, P, and T. The toggle relays are preset to respond to sequentially increasing pneumatic pressures. For example, we may assume that relay M will respond to a minimum pressure of 8 p.s.i., relay P will respond to a minimum pressure of 10 p.s.i., and relay T will respond to a minimum pressure of 12 p.s.i. Thus, a 13 p.s.i. weight signal will actuate all toggle relays M, P, and T while a 9 p.s.i. signal will actuate only relay M. The effect of actuation of a toggle relay is to permit the air supply to pass. Operation will be described in detail later. The air supply pressure need not be modified by the toggle relay.

For purposes of discussing the operation of the sorting sections, we may assume that the toggle relays are preset at the above values and that the weight signal in conduit 5 is 9 p.s.i. Thus toggle relay M will be actuated while toggle relays P and T will not. Since relay M has been actuated, a constant pressure air supply is conducted through line 6 through normally open valve Q to bonnet 7 of pneumatically-operated four-way valve N. Valve N has a constant air supply which is conducted through conduits 8 and 9 in one direction or the other depending on the valve's position. The air supply moves double-acting pneumatic piston O in one direction or the other depending on the position of valve N. Pneumatic piston O actuates sorting arm W which meets the ham and directs it off the conveyor belt to a bin, chute, separate conveyor, or the like.

Operation of dump valve J reduces the weight signal generated by booster K to zero, which releases any actuated toggle relays, thus discharging the operating signal in line 6, resulting in the return to normal position of arm W. The sorting section is now ready for the next ham, as directed by the appropriate weight signal already developed and preserved in the memory section.

It will be noted from the above discussion that valve Q is normally open. However, if the weight signal were above the actuation minimum for toggle relay P, i.e. 11 p.s.i., valve Q would be closed by toggle relay P and the air supply from toggle relay M intercepted before it could operate valve N. Thus the only arm to be moved would be that associated with 4-way valve R.

The terminal sorting section comprising components T, $T^1$, U and $U^1$ is not subject to cancellation by a next succeeding station through a valve corresponding to valves Q and $T^1$. In other respects, it is, however, identical. Obviously, more than three sorting stations may be employed. Thus, it will be seen that the sorting portion of our invention preferably comprises (1) an initial sorting station having means M adapted to receive a pneumatic weight signal and transmit an operating signal in response to such a weight signal of predetermined value and deflecting means N, O, and W adapted to receive said operating signal and deflect an approaching article, and (2) at least one subsequent sorting station substantially identical to said initial station but including also means adapted to receive said operating signal and, in response thereto, to prevent the performance of the deflecting means of the next preceding sorting station.

The full potential of our invention can be realized by using a memory section as described. This enables the apparatus to weigh and sort two different hams simultaneously. However, the apparatus may operate without the use of the memory section. In this case, the weight signal is transmitted from signal generator D to toggle relays M, P, etc., passing through a checkvalve and booster associated with dump valve for discharging the signal on command of an automatic programmer. Without the memory section, a second ham cannot be weighed until the first has been deflected and the operating signal exhausted, preferably by a dump valve provided for the purpose.

It will be apparent to those skilled in the art that other memory devices may be substituted for the one disclosed herein. Any apparatus capable of receiving, storing, and releasing one or more pneumatic pressure signals on command of an automatic programmer will suffice.

As explained in the copending application referred to above, a preferred programmer is a revolving cam type such as cycle controllers models E186T and T-325-88 manufactured by The Sinclair-Collins Valve Company, Akron, Ohio. These or other programmers may be used to coordinate not only the memory section but also the feeding section. For example, it is most expedient to assure maximum efficiency by delivering a ham from the weighing section to the sorting section at the moment the previous ham is deflected from the sorting section belt. This may be accomplished by including the operation of fed belt A and gate B in the program sequence and adjusting the relative speed of the weighing section belt and the sorting section belt. For most operations, even those employing as few as two or three sorting stations, the sorting section belt may travel considerably faster than the weighing section belt. This is especially desirable where several sorting stations form a sorting section considerably longer than the weighing section. Our sorting system is quite capable of handling articles at speeds heretofore impractical for many types of articles. For example, it has been used to sort hams into 9 weight classifications at the rate of 1320 hams per hour.

It will be apparent to those skilled in the art that our invention is not limited to the performance of sorting operations. The operating signals developed in the stations described as sorting stations may be employed to perform various types of operations such as filling, mixing, etc. For example, the articles weighed may be containers having varying amounts of content, it being desired to add an additional amount of the same or a different material. The operating signals may be utilized to open and close fluid valves, etc., for example, to perform varying functions as desired. Moreover, our invention is adaptable to the use of more than one type of process station. The output from the memory device in line 5 may be directed to another memory section to be delayed until the sorting or other process step is completed, to perform still another step.

Referring back to FIG. 1, operation of the weighing station is as follows: It is a standard pneumatic force balance device having a beam 1 and fulcrum 2. The weight to be measured is a force exerted on platform and support F tending to rotate beam 1 counterclockwise. An upward pneumatic pressure force in chamber C compensates for the weight of the platform and belt Y. The counterclockwise moment opens valve 13 in device D, permitting the air supply to enter its lower chamber to the extent necessary to balance the counterclockwise force of the object weight. The pressure in the lower chamber is the output in line 3. Any device capable of generating a pneumatic pressure proportional to a weight may be substituted.

In FIG. 2, pilot-operated toggle relays M, P, and T operate as follows: Spring 15 is preset at the tension desired. The input signal from line 5 enters chamber 16, tending to force the diaphragm to the left. If the force is sufficient to overcome the spring tension, valve 17 is opened, permitting the air supply to open valve 18, which permits the air supply to pass to output line 6. The air supply may also be passed to another diaphragm not shown, to aid in urging spring 15 to the left. Any device capable of transmitting an operating signal in response to a predetermined weight signal may be substituted.

The preferred embodiment of 4-way valve N is fully described in a publication of the manufacturer, Valvair Company, entitled "Single Diaphragm Operated Four Way Valve, Open End Exhaust." The particular preferred embodiment is Valvair Model No. 10–24–60 single diaphragm operated four way valve, with open end exhaust, presently commercially available. Any four way valve may be substituted. Indeed, any device capable of deflecting or otherwise classifying an object in response to an operating signal may be substituted for four way valve N, cylinder O, and arm W.

We do not intend to be restricted to the specific preferred embodiment shown. Our invention may be otherwise variously practiced within the scope of the following claims.

We claim:

1. Apparatus for sorting articles according to their weight comprising:
   (a) weighing means for receiving an article and generating a pneumatic pressure weight signal proportional to the weight of said article,
   (b) a memory device including at least two circuits for preserving weight signals and means for transmitting weight signals so preserved,
   (c) a sorting section comprising
      (1) an initial deflecting station comprising (i) toggle means for receiving said weight signal and transmitting an operating signal if said weight signal exceeds a predetermined value and (ii) deflecting means for deflecting said article on direction of said operating signal,
      (2) at least one additional deflecting station substantially identical to said initial deflecting station but including also valve means operable by the operating signal of said additional deflecting station to prevent the operation of the deflecting means in the next preceding deflecting station by preventing the transmission of the operating signal of the next preceding deflecting station to its deflecting means,
         the predetermined value above which the operating signal is transmitted being higher in each successive deflecting station than in the one preceding it,
   (d) means for conveying articles sequentially from said weighing means to said sorting section.

2. Apparatus for sorting articles according to their weight comprising:
   (a) weighing means for receiving an article and generating a pneumatic pressure weight signal proportional to the weight of said article,
   (b) a memory section comprising at least two signal delay circuits, each comprising,
      (1) a normally closed input valve for receiving said weight signal,
      (2) a check valve for transmitting a fluid pressure memory signal from said normally closed input valve, (3) a relay for receiving said memory signal and generating a separate output signal as a function thereof, (4) normally closed valve means for transmitting said output signal, and (5) exhaust means for releasing said memory signal to exhaust, (c) a sorting section comprising, (1) an initial deflecting station comprising (i) toggle means for receiving said output signal and transmitting an operating signal if said output signal exceeds a predetermined value and (ii) deflecting means for deflecting said article on direction of said operating signal, (2) at least one additional deflecting station substantially identical to said initial deflecting station but including also valve means operable by the operating signal of said additional deflecting station to prevent the operation of the deflecting means in the next preceding deflecting station by preventing the transmission of the operating signal of the next preceding deflecting station to its deflecting means, the predetermined value above which the operating signal is transmitted being higher in each successive deflecting station than in the one preceding it, (d) means for conveying articles sequentially from said weighing means to said sorting section.

References Cited in the file of this patent

UNITED STATES PATENTS

| | | |
|---|---|---|
| 2,488,037 | Rupley | Nov. 15, 1949 |
| 2,938,626 | Dahms | May 31, 1960 |
| 2,947,417 | Reynolds | Aug. 2, 1960 |